United States Patent
Slat et al.

(10) Patent No.: US 6,461,697 B1
(45) Date of Patent: Oct. 8, 2002

(54) POLYETHYLENE TEREPHTHALATE MULTI-LAYER PREFORM USED FOR PLASTIC BLOW MOLDING

(75) Inventors: William A. Slat, Brooklyn, MI (US); Richard C. Darr, Seville, OH (US)

(73) Assignee: Plasipak Packaging, Inc., Plymouth, MI (US)

( * ) Notice: Subject to any disclaimer, the term of this patent is extended or adjusted under 35 U.S.C. 154(b) by 1055 days.

(21) Appl. No.: 08/701,068

(22) Filed: Aug. 21, 1996

Related U.S. Application Data

(63) Continuation of application No. 08/444,021, filed on May 18, 1995, now abandoned, which is a continuation of application No. 08/120,161, filed on Sep. 10, 1993, now abandoned.

(51) Int. Cl.[7] .............................. B32B 27/36; B32B 9/04
(52) U.S. Cl. ................ 428/35.7; 428/36.91; 428/542.8; 428/903.3; 215/12.2; 264/513; 264/512
(58) Field of Search ............................ 428/36.91, 36.9; 264/513, 512

(56) References Cited

U.S. PATENT DOCUMENTS

| | | | |
|---|---|---|---|
| 3,719,735 A | 3/1973 | Valyi | |
| 3,737,259 A | 6/1973 | Valyi | |
| 3,787,157 A | 1/1974 | Valyi | |
| 3,813,198 A | 5/1974 | Valyi | |
| 3,869,056 A | 3/1975 | Valyi | |
| 3,878,282 A | 4/1975 | Bonis et al. | |
| 3,955,697 A | 5/1976 | Valyi | |
| 3,994,649 A | 11/1976 | Valyi | |
| 4,013,748 A | 3/1977 | Valyi | |
| 4,034,054 A | 7/1977 | Sauer | |
| 4,040,233 A | 8/1977 | Valyi | |
| 4,047,874 A | 9/1977 | Valyi | |
| 4,067,944 A | * 1/1978 | Valyi | 264/89 |
| 4,079,851 A | 3/1978 | Valyi | |
| 4,085,177 A | 4/1978 | Sauer | |
| 4,092,391 A | 5/1978 | Valyi | |
| 4,107,362 A | 8/1978 | Valyi | |
| 4,109,813 A | 8/1978 | Valyi | |
| 4,130,387 A | 12/1978 | Sauer | |
| 4,149,645 A | 4/1979 | Valyi | |
| 4,162,883 A | 7/1979 | Sauer | |
| 4,224,275 A | 9/1980 | Sauer | |
| 4,289,817 A | 9/1981 | Valyi | |
| 4,307,137 A | 12/1981 | Ota et al. | |
| 4,327,052 A | 4/1982 | Sauer | |
| 4,391,861 A | * 7/1983 | Nilsson | 428/36.91 |
| 4,501,781 A | 2/1985 | Kushida et al. | |
| 4,513,037 A | 4/1985 | Collins | |
| 4,534,930 A | 8/1985 | Nohara | |
| 4,587,073 A | 5/1986 | Jakobsen | |
| 4,646,925 A | 3/1987 | Nohara | |
| 4,647,483 A | 3/1987 | Tse et al. | |
| 4,665,135 A | 5/1987 | Tse et al. | |
| 4,683,170 A | 7/1987 | Tse et al. | |
| 4,741,936 A | 5/1988 | Nohara et al. | |
| 4,781,954 A | 11/1988 | Krishnakumar et al. | |
| 4,797,244 A | 1/1989 | Sauer | |
| 4,798,883 A | 1/1989 | Tung et al. | |
| 4,980,211 A | 12/1990 | Kushida et al. | |
| 4,996,269 A | 2/1991 | Richeson et al. | |
| 5,039,780 A | 8/1991 | Hashimoto et al. | |
| 5,102,705 A | 4/1992 | Yammoto et al. | |
| 5,115,047 A | 5/1992 | Hashimoto et al. | |
| 5,443,767 A | 8/1995 | Cahill | 264/37 |
| 5,728,347 A | * 3/1998 | Collette et al. | 264/512 |

FOREIGN PATENT DOCUMENTS

DE 2819766 11/1978

* cited by examiner

*Primary Examiner*—Rena L. Dye
(74) *Attorney, Agent, or Firm*—Brooks & Kushman P.C.

(57) ABSTRACT

A polyethylene terephthalate multi-layer preform (26) and a method for making the preform provides an inner layer (28) of virgin polyethylene terephthalate and an injection molded outer layer (30) of post consumer recycled polyethylene terephthalate which by weight is at least 75% of the total weight of the preform. The inner layer (28) of virgin polyethylene terephthalate is thermoformed prior to the injection molding of the outer layer (30) of post consumer recycled polyethylene terephthalate. A relatively large amount of the post consumer recycled polyethylene terephthalate can be utilized due to the thermoforming and injection molding as disclosed. More specifically, the post consumer recycled polyethylene terephthalate preferably by weight is 85%, most preferably in the range of 88 to 92% and optimally about 90% of the total weight of the preform.

3 Claims, 2 Drawing Sheets

POLYETHYLENE TEREPHTHALATE MULTI-LAYER PREFORM USED FOR PLASTIC BLOW MOLDING

This is a continuation of application Ser. No. 08/444,021 filed on May 18, 1995, now abandoned, which is a continuation application of Ser. No. 08/120,161 filed on Sep. 10, 1993, and now abandoned.

TECHNICAL FIELD

This invention relates to a polyethylene terephthalate multi-layer preform used for plastic blow molding and to a method for making the preform.

BACKGROUND ART

Plastic blow molding is conventionally performed by providing a hot plastic parison either from extruded plastic or as a preform which is usually injection molded from plastic. Usually, such preforms are composed of a single type of plastic that is injected into a mold through a single port. However, there have also been attempts to provide coinjection of more than one plastic into a mold so as to provide different layers of plastic.

U.S. Pat. No. 3,878,282 to Bonis et al. discloses a process for molding multi-layer articles that are specifically disclosed as a preform-type parison with different layers. The process involved is performed by injection molding the different layers within different molds while mounted on the same inner mandrel during the injection of each layer.

U.S. Pat. No. 4,307,137 to Ota et al. discloses a method for forming an optical design pattern in polyethylene terephthalate articles which are specifically disclosed as a blow molding preform having inner and outer members with the inner member having an open end defining a thread closure and with the outer member having a junction with the inner member toward a closed end of the preform from the thread closure.

U.S. Pat. No. 4,391,861 to Nilsson discloses a preform of a thermoplastic and has a two-part interfitted construction and at least one intermediate layer that functions as a gas barrier, and also discloses that the outer part may be previously used and reprocessed material.

U.S. Pat. No. 4,646,925 to Nohara discloses a multi-layer preform for draw-blow forming a bottle which has inner and outer layers with a junction that is located toward a closed end of the preform from a closure thread at an open end of the preform. The preform also includes a gas barrier intermediate the inner and outer layers.

U.S. Pat. No. 5,102,705 discloses a bottle made of polyethylene naphthalate resin produced by highly stretching a preform in a manner that is disclosed as limiting gas permeability and x-ray transmission.

There have been attempts in the past such as disclosed by the aforementioned Nilsson patent to utilize post consumer recycled plastic for plastic blow molding since such reuse reduces the need for additional land fills as well as conserving on natural resources in the manufacturing of new articles. Such prior attempts have utilized injection molding or extrusion which necessarily limits the amount of post consumer recycled plastic which can be utilized since it is difficult to injection mold or extrude relatively thin wall preforms or extruded parisons used for plastic blow molding. The maximum amount of post consumer recycled plastic which has been used to date is about 50% by weight of the total weight of the preform.

Blow molding has also previously been performed utilizing a preform that is initially thermoformed from film, i.e. sheet plastic, that provides a moisture and/or oxygen barrier prior to injection molding of an outer protective layer. After the thermoforming, the formed film is trimmed and the outer layer is then injection molded around the thermoformed plastic prior to the finished preform being blow molded to provide the resultant container.

DISCLOSURE OF INVENTION

One object of the present invention is to provide an improved polyethylene terephthalate multilayer preform used for plastic blow molding.

In carrying out the above object, the polyethylene terephthalate multi-layer preform used for plastic blow molding has a thermoformed inner layer of virgin polyethylene terephthalate that has a surface defining a hollow interior of the preform. The preform also has an injection molded outer layer of post consumer recycled polyethylene terephthalate that by weight is greater than 75% of the total weight of the preform and the preform has an outwardly exposed exterior surface defined entirely by the outer layer of the post consumer recycled polyethylene terephthalate.

In the preferred construction of the polyethylene terephthalate multi-layer preform, the post consumer recycled polyethylene terephthalate is by weight greater than about 85% of the total weight of the preform, most preferably in the range of about 88–92% of the total weight of the preform, and optimally about 90% of the total weight of the preform.

In the preferred construction, the polyethylene terephthalate multi-layer preform has the inner layer of virgin polyethylene terephthalate thermoformed which permits the relatively thin wall construction thereof that allows the increased use of the greater amount of post consumer recycled polyethylene terephthalate than has been possible in the past.

Another object of the invention is to provide an improved method for making a polyethylene terephthalate multi-layer preform used for plastic blow molding.

In carrying out the immediately preceding above object, the method for making a polyethylene terephthalate multi-layer preform used for plastic blow molding is performed by thermoforming a sheet of virgin polyethylene terephthalate to provide an inner layer and then injection molding an outer layer of post consumer recycled polyethylene terephthalate around the inner layer of virgin polyethylene terephthalate.

In the preferred practice of the method, the thermoforming and injection molding are performed so that the injection molded outer layer of post consumer recycled polyethylene terephthalate is greater than 75% of the total weight of the preform, more preferably greater than about 85% of the total weight of the preform, most preferably in the range of about 88–92% of the total weight of the preform, and optimally about 90% of the total weight of the preform.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
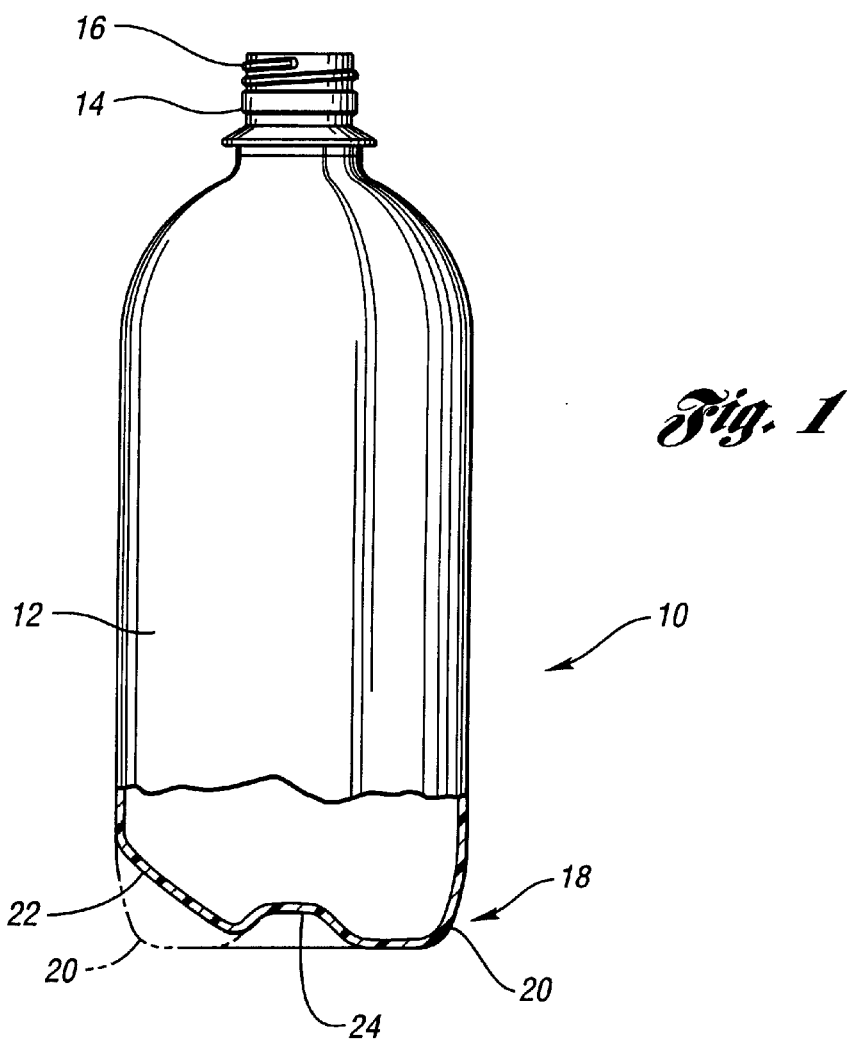
FIG. 1 is a partially broken away side elevational view of a plastic blow molded container formed from a preform according to the present invention.

With reference to FIG. 1 of the drawings, a plastic blow molded container generally indicated by 10 is blow molded from a multi-layer preform constructed according to the present invention as is hereinafter more fully described. The plastic blow molded container 10 includes a cylindrical body portion 12 that extends vertically. An upper end closure 14 of the container is unitary with the upper extremity of the cylindrical body portion 12 and includes a dispensing spout which is illustrated as having a thread 16 for securing an unshown cap-type closure. The container also includes a freestanding base structure 18 unitary with the cylindrical body portion 12 to close its lower extremity. The freestanding base structure 18 further includes a plurality of downwardly projecting hollow legs 20 (only one shown) spaced circumferentially from each other with respect to the body portion. The freestanding base structure 18 also includes a plurality of curved ribs 22 (only one shown) spaced circumferentially from each other between the downwardly projecting legs 20. The freestanding base structure 18 of the container also includes a central hub 24 with the legs 20 and curved ribs 22 extending radially therefrom in a circumferentially alternating relationship to each other. Of course, it should be understood that while the container illustrated is of the freestanding type with legs and curved ribs, other freestanding containers without legs and curved ribs as well as containers that have a lower base cup for support can also be blow molded from preforms according to the present invention as described below.

Figure 2:
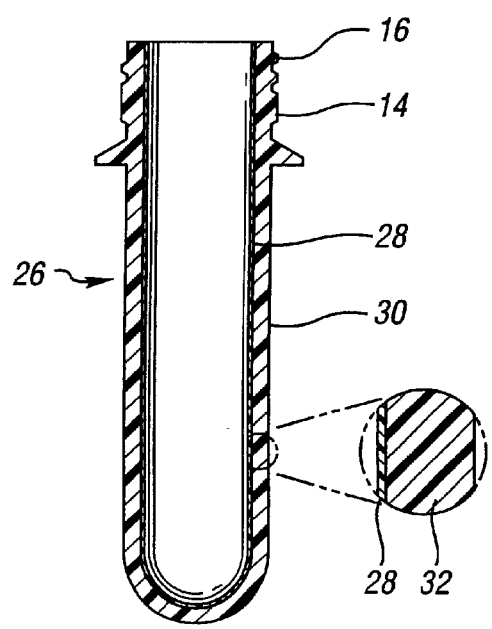
FIG. 2 is an elevational sectional view of one embodiment of a preform that is constructed in accordance with the present invention to include an inner layer of virgin polyethylene terephthalate and an outer layer that is injection molded from post consumer recycled polyethylene terephthalate.

With reference to FIG. 2, a polyethylene terephthalate multi-layer preform 26 used for plastic blow molding is constructed with a vertically extending tubular shape having a lower closed end and an upper open end from which the container 10 shown in FIG. 1 is blow molded. This blow molding is preferably performed by stretch blow molding to provide biaxial orientation of the container wall so as to have enhanced strength.

Figure 3:
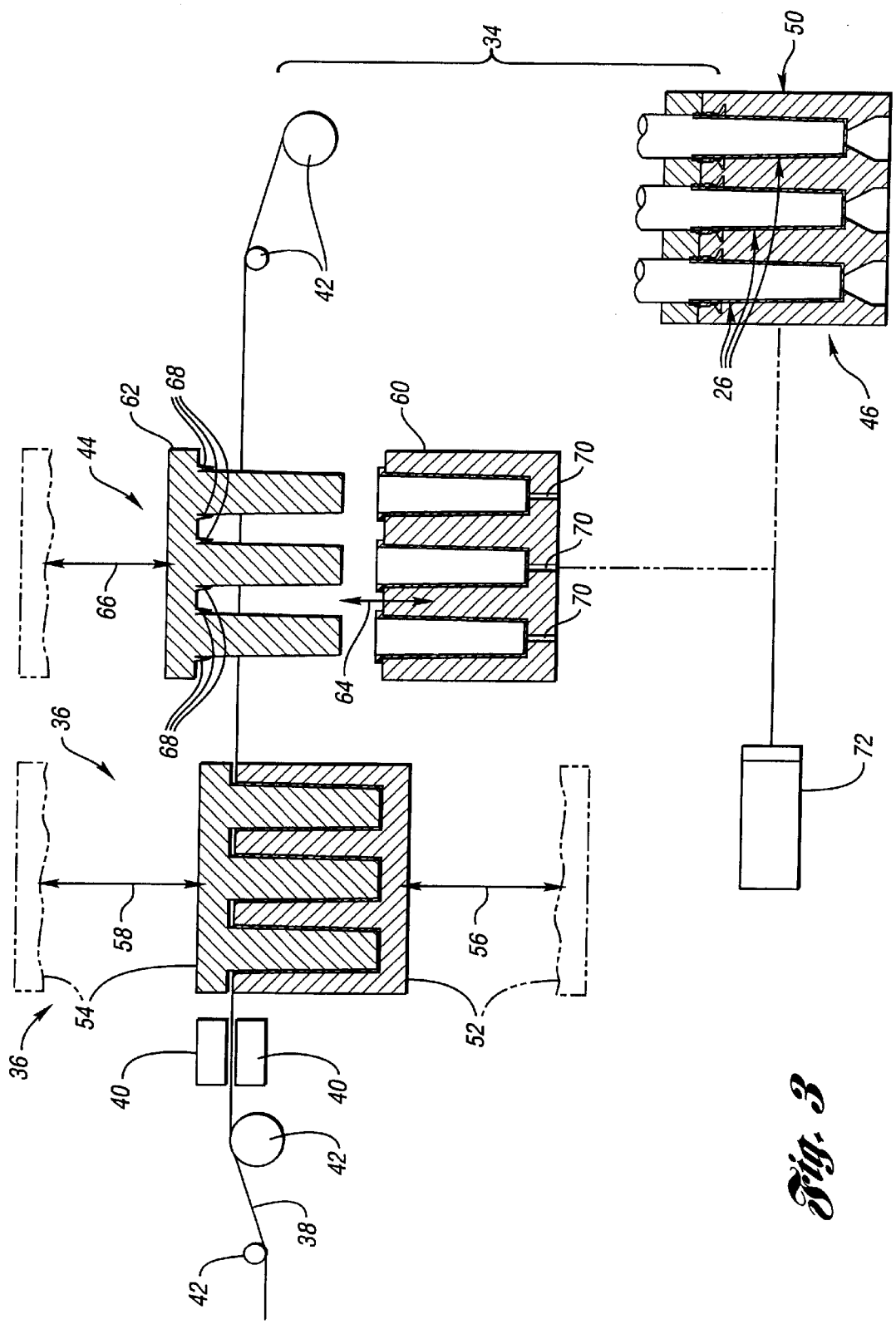
FIG. 3 is a view that illustrates apparatus for performing the method of the invention to make the preform illustrated in FIG. 2 which is subsequently blow molded to provide the container illustrated in FIG. 1.

With reference to FIG. 3, apparatus 34 performs the method for making a polyethylene terephthalate multi-layer preform 26 used for plastic blow molding as illustrated in FIG. 2. More specifically, the apparatus 34 includes a thermoforming station 36 for thermoforming a sheet 38 of virgin polyethylene terephthalate to provide the inner layer 28 of the elongated tubular construction having a closed end and an open end as previously described. Suitable heaters 40 heat the sheet 28 of virgin polyethylene terephthalate which is essentially a film of the required thickness prior to the thermoforming at the thermoforming station 36. Rolls 42 move the sheet 38 of virgin polyethylene terephthalate along the apparatus from the left toward the right as illustrated. After the thermoforming as is hereinafter more fully described, the sheet 38 of virgin polyethylene terephthalate is moved to a trimming station 44 where the upper open end of the inner layer 28 of virgin polyethylene terephthalate is cut from the rest of the sheet for subsequent transfer as is hereinafter more fully described to an injection molding machine 46. Thereafter, the injection molding of the outer layer of post consumer recycled polyethylene terephthalate is performed around the inner layer 28 of virgin polyethylene terephthalate.

The polyethylene terephthalate multi-layer preform 26 illustrated in FIG. 2 has a thermoformed inner layer 28 of virgin polyethylene terephthalate that has a surface defining an interior of the preform. The preform 26 also has an outer layer 30 of post consumer recycled polyethylene terephthalate. This outer layer 30 of post consumer recycled polyethylene terephthalate by weight is greater than about 75% of the total weight of the preform and the preform has an outwardly exposed exterior surface defined entirely by the outer layer of post consumer recycled polyethylene terephthalate.

In the preferred construction of the preform 26 shown in FIG. 2, the injection molded outer layer of post consumer recycled polyethylene terephthalate by weight is greater than about 85% of the total weight of the preform, is most preferably in the range of about 88–92% of the total weight of the preform, and optimally is about 90% of the total weight of the preform.

The construction of the polyethylene terephthalate multi-layer preform 26 used for plastic blow molding is made with the inner layer of virgin polyethylene terephthalate thermoformed which allows the greater use of post consumer recycled polyethylene terephthalate than has been possible in the past.

With reference to FIG. 3, the thermoforming station 36 has lower and upper mold members 52 and 54 which are moved between the open phantom line indicated positions and the closed solid line indicated positions along the directions of arrows 56 and 58 to perform the thermoforming and then release the thermoformed inner layer for the trimming and subsequent injection molding. It should be noted that multiple preform inner layers are simultaneously thermoformed, trimmed and injection molded for efficiency. More specifically, the thermoforming is most efficiently performed at multiple numbers that facilitate effective transfer to the particular injection molding machine 46 where multiple preforms are injection molded. Each cycle of the thermoforming commences with the lower and upper mold members 52 and 54 in their phantom line indicated positions whereupon movement of these mold members toward each other forms the heated sheet into the inner layer 28 of virgin polyethylene terephthalate, preferably with multiple formings taking place upon each stroke as described above.

With further reference to FIG. 3, after the thermoforming as previously described, the sheet 38 of virgin polyethylene terephthalate is moved by the rolls 42 to the trimming station 44 where lower and upper trimming members 60 and 62 are located. These lower and upper trimming members 60 and 62 are moved toward and away from each other as illustrated by arrows 64 and 66 such that sharp cutters 68 thereof separate the upper open end of each inner layer from the rest of the associated sheet. The lower member 60 preferably has vacuum passages 70 through which a vacuum is drawn to hold the trimmed inner layers to this member prior to transfer thereof by a suitable actuator 72 to the injection molding machine 44 where positioning of each inner layer within the mold 50 thereof for the injection molding of the outer layer 30 of polyethylene terephthalate as previously described.

It should also be noted that the polyethylene terephthalate multi-layer preform 26 illustrated in FIG. 2 can be provided with a gas barrier to prevent transmission of gas if necessary.

One way the gas barrier can be provided is on the inner side of the inner layer 28 of virgin polyethylene terephthalate. Another way in which the gas barrier can be provided is between the inner layer 28 of virgin polyethylene terephthalate and the outer layer 30 of post consumer recycled polyethylene terephthalate. Use of ethyl vinyl alcohol as the gas barrier would preferably be provided to the inner layer 28 of virgin polyethylene terephthalate by a dipping, coating or spraying operation etc. before, during or after the thermoforming of the inner layer 28 but before the injection molding of the outer layer 30. This application of the ethyl vinyl alcohol must be between the inner and outer layers 28 and 30 and should terminate short of the upper extremity of the preform 26 so that the ethyl vinyl alcohol is not exposed to the atmosphere; otherwise the ethyl vinyl alcohol will absorb moisture from the atmosphere and lose its ability to prevent transmission of gas through the container that is blow molded from the preform.

While the best mode for carrying out the invention has been described in detail, those familiar with the art to which this invention relates will recognize various alternative ways of practicing the invention as described by the following claims.

What is claimed is:

1. A polyethylene terephthalate multi-layer preform used for plastic blow molding, comprising:

a thermoformed inner layer of virgin polyethylene terephthalate that has a surface defining a hollow interior of the preform;

an injection molded outer layer of post consumer recycled polyethylene terephthalate that by weight is greater than 85% of the total weight of the preform, and the preform having an outwardly exposed exterior surface defined entirely by the injection molded outer layer of post consumer recycled polyethylene terephthalate; and the inner and outer layers cooperating to define closed and open ends of the preform, and the injection molded outer layer at the open end of the preform including a thread for securing a closure.

2. A polyethylene terephthalate multi-layer preform used for plastic blow molding, comprising:

a thermoformed inner layer of virgin polyethylene terephthalate that has a surface defining a hollow interior of the preform;

an injection molded outer layer of post consumer recycled polyethylene terephthalate that by weight is in the range of 88–92% of the total weight of the preform, and the preform having an outwardly exposed exterior surface defined entirely by the outer layer of post consumer recycled polyethylene terephthalate; and the inner and outer layers cooperating to define closed and open ends of the preform, and the injection molded outer layer at the open end of the preform including a thread for securing a closure.

3. A polyethylene terephthalate multi-layer preform used for plastic blow molding, comprising:

a thermoformed inner layer of virgin polyethylene terephthalate that has a surface defining a hollow interior of the preform;

an injection molded outer layer of post consumer recycled polyethylene terephthalate that by weight is 90% of the total weight of the preform, and the preform having an outwardly exposed exterior surface defined entirely by the outer layer of post consumer recycled polyethylene terephthalate; and the inner and outer layers cooperating to define closed and open ends of the preform, and the injection molded outer layer at the open end of the preform including a thread for securing a closure.

* * * * *